United States Patent [19]

Taverez

[11] 4,294,596
[45] Oct. 13, 1981

[54] AIR-FILTER APPARATUS IN COMBINATION WITH A TURBINE ENGINE

[76] Inventor: Dan Taverez, 17375 Brookhurst, No. 46, Fountain Valley, Calif. 92644

[21] Appl. No.: 143,880

[22] Filed: Apr. 25, 1980

[51] Int. Cl.³ .................... B01D 45/10; B01D 46/04; B01D 46/22

[52] U.S. Cl. ........................................ 55/242; 55/290; 55/291; 55/296; 55/302; 55/354; 55/385 B; 180/54 A; 180/301

[58] Field of Search ................ 55/242, 290, 291, 296, 55/302, 354, 385 B; 180/54 A, 301

[56] References Cited

U.S. PATENT DOCUMENTS

| | | | |
|---|---|---|---|
| 1,377,191 | 5/1921 | Eddy | 55/290 |
| 2,634,713 | 4/1953 | Bartch et al. | 55/354 |
| 2,736,390 | 2/1956 | Wickland | 55/242 |
| 3,075,333 | 1/1963 | Revell | 55/242 |
| 3,360,907 | 1/1968 | Clark, Jr. et al. | 55/290 |
| 3,375,638 | 4/1968 | Dungler | 55/242 |
| 3,487,620 | 1/1970 | Klein et al. | 55/290 |
| 3,717,978 | 2/1973 | Osborne, Jr. | 55/242 |
| 3,757,493 | 9/1973 | Johnston et al. | 55/242 |
| 4,125,147 | 11/1978 | Bailey | 55/385 B |

FOREIGN PATENT DOCUMENTS

| | | | |
|---|---|---|---|
| 541687 | 12/1931 | Fed. Rep. of Germany | 55/290 |
| 1295458 | 5/1962 | France | 55/290 |

Primary Examiner—David L. Lacey
Attorney, Agent, or Firm—Francis X. LoJacono

[57] ABSTRACT

An air-filter apparatus for use with gas-turbine and like engines, wherein the filter is formed as a continuous moving blanket-like belt. There is also provided a continuous cleaning system which includes rotating brushes engaging the filter blanket to loosen the foreign matter captured therein, and a cleaning fluid applicator which allows a vacuum-cleaning device to separate the foreign matter as the filter blanket continuously passes over the intake portion of the engine.

3 Claims, 3 Drawing Figures

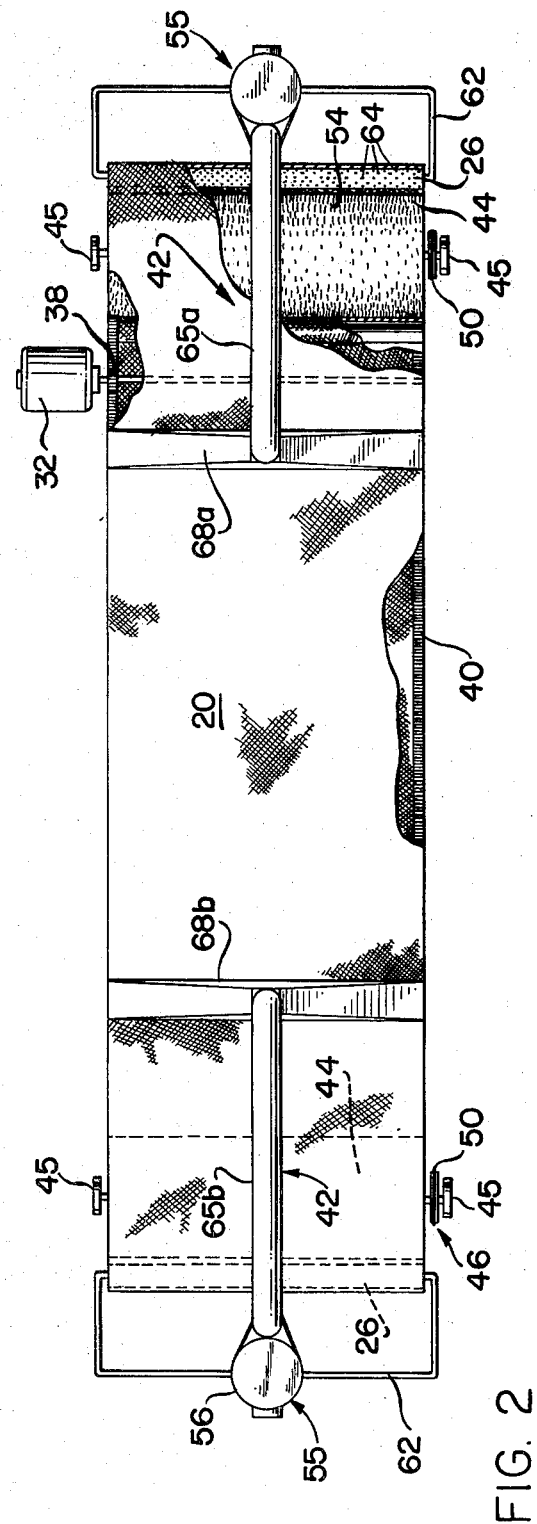
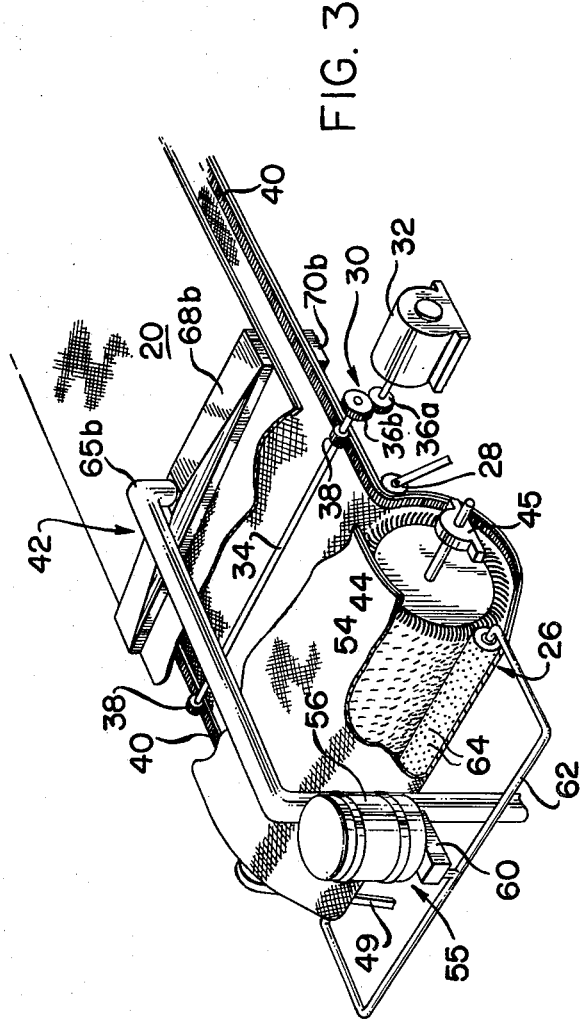
FIG. 2
FIG. 3

AIR-FILTER APPARATUS IN COMBINATION WITH A TURBINE ENGINE

BACKGROUND OF THE INVENTION

1. Field of the Invention

This invention relates to a filter apparatus, and more particularly to an apparatus having a filter formed as a continuous moving belt.

2. Description of the Prior Art

As is well known in the art, various problems and difficulties are encountered in providing suitable means for filtering air entering turbine engines and the like, particularly where turbine engines are employed in operating or moving vehicles.

Several types of filter devices have been tried and are presently in use to provide a clean air intake for turbine engines. However, these devices have features that restrict and limit their use. At present, these devices generally comprise a single filter screen which is positioned in front of the intake portion of the engine; and this screen must be replaced as it becomes saturated with foreign matter.

Gas-turbine engines in vehicles such as armored tanks are exposed to excessive dirt, dust and various other foreign particles as the vehicle travels on unpaved roads and open fields. Such conditions as these considerably shorten the running mileage of the vehicle. Thus, under critical operating requirements wherein the tank must travel long distances in rough terrain—particularly during combat—the limited operating range presents a great hazard to the military personnel therein.

Thus, at present, a filter apparatus is sorely needed to overcome such limited operating conditions, particularly in such combat vehicles.

SUMMARY AND OBJECTS OF THE INVENTION

The present invention has for an important object to provide an air-filter system that is compatible with turbine engines, whereby the engine operating life can be extended, even under the most severe operating conditions, allowing a turbine engine vehicle to travel long distances without the need for frequent filter changes. This system provides a unique concept wherein a filter is formed as a continuous belt that moves transversely across the intake opening of a turbine engine, the filter belt being also continuously subjeced to a cleaning process as it moves. The cleaning process includes the use of a pair of rotating cylindrical brushes, a cleaning fluid applicator, and a vacuum means.

It is another of the invention to provide an apparatus of this character wherein the vacuum device is operated by the intake system of the turbine engine.

It is still another object of the present invention to provide an air-filter apparatus that is easy to service and maintain.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 2 is a front-plan diagrammatic view thereof, with portions broken away to show clearly the various operating parts thereof; and FIG. 3 is a partial pictorial view of one end of the air-filter apparatus.

DESCRIPTION OF THE PREFERRED EMBODIMENT

Figure 1:
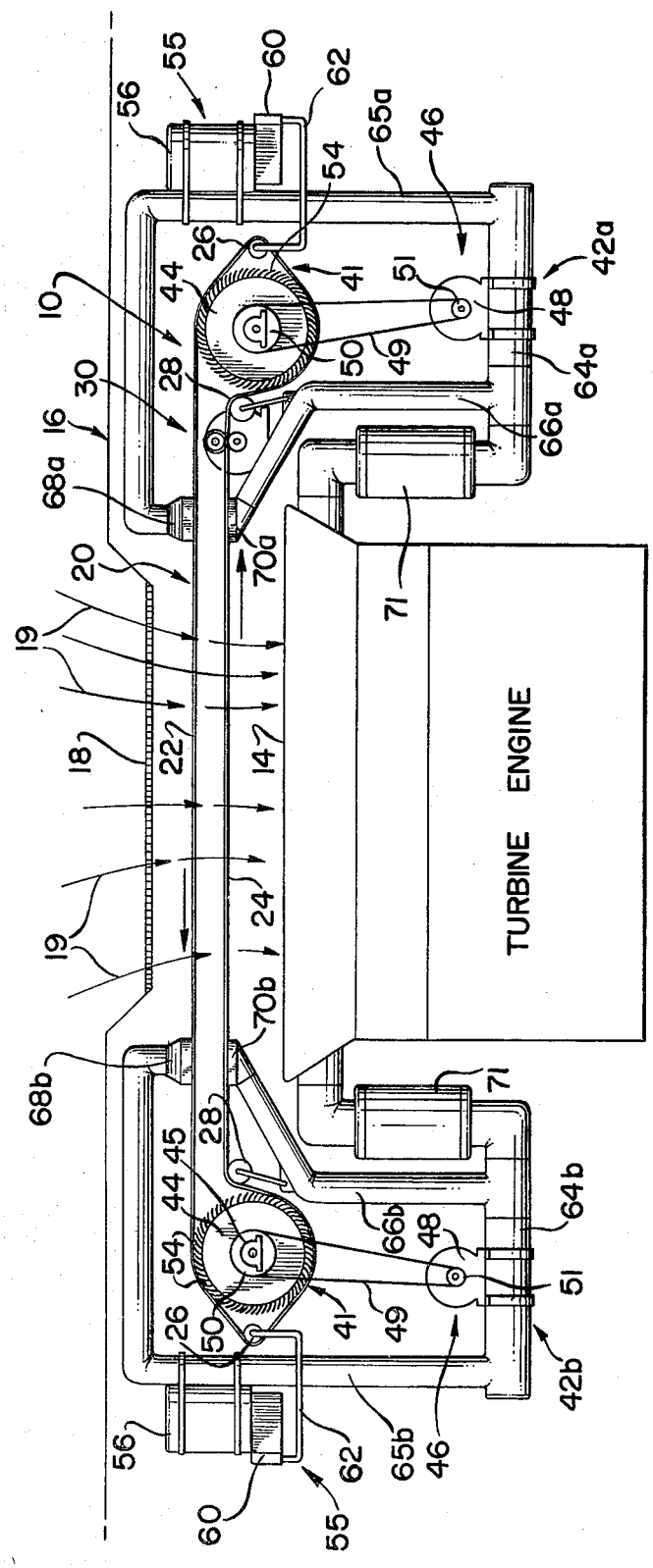
FIG. 1 is a top-plan diagrammatic view of the air-filter apparatus as it is positioned relative to the intake portion of the turbine engine.

Referring to the drawing by characters of reference, FIGS. 1, 2 and 3 disclose an air-filter apparatus or system, generally indicated at 10. These views are shown in a diagrammatic form, since it should be understood that this apparatus can be incorporated with various types of vehicles employing turbine engines, ranging from the commonly used cars, trucks, busses, etc., to—more specifically—recently produced armored vehicles for military combat.

More particularly referring to FIG. 1, there is shown schematically a turbine engine having a typical intake portion 14 wherein the turbine impellers are generally located. Since this type of engine is well known, no further detailed description is felt to be necessary. However, there is generally represented by line 16 a portion of a vehicle body structure that includes a typical grilled opening 18 through which air (indicated by arrows 19) must pass in order to enter intake 14. Thus, as air passes therethrough, it is filtered—the foreign particles being captured by the filter system.

Accordingly, the air-filter apparatus or system 10 comprises a filter means which is defined by a continuous blanket-like belt 20, which will be formed from a suitable filter material such as a synthetic fiber capable of withstanding high temperatures. The continuous filter blanket 20 is shown interposed between opening 18 of the vehicle 16 and the intake 14 of the engine. The blanket-like belt 20 is suspended across the full intake opening, the belt 20 being superposed with a first outer layer 22 and a second inner layer 24 which continuously move opposite from each other longitudinally. That is, blanket 20 is looped over rotatable support spindle guides 26, which will be mounted in a suitable manner to the vehicle body structure to allow the blanket-like belt to be driven in a continuous longitudinal movement as the air passes through the oppositely moving layers. To further provide a predetermined tension means, there is included a pair of tensioning spindles which can be placed under a spring-loaded biasing force, the spindles being indicated at 28.

In order to provide the liner rotational movement to belt 20, there is employed a first drive means 30 which comprises a motor 32 that is interconnected to a belt-drive shaft 34 by gears 36a and 36b. Gear 36b is attached to one end of shaft 34 as shown in FIG. 3, the shaft being provided with drive gears 38 which are positioned on shaft 34 so as to engage respective gear belts 40. Gear belts 40 are affixed to the inner sides of belt blanket 20 so as to allow motor 32 to drive blanket 20 at a pre-determined r.p.m.

It should be noted that a predetermined speed of the belt blanket movement is necessary to allow the cleaning means 41 included therein to be operated as required, causing the trapped foreign particles to be easily and readily separated therefrom by a vacuum means, generally indicated at 42. Cleaning means 41 comprises a pair of rotating brush drums 44 that are located within the continuous loop of belt/blanket 20, the drums 44 being supported and journalled in bearing members 45 of any suitable type. Bearing 45 will be secured to the vehicle structure in a well known manner, whereby each brush drum 44 can be provided with a second drive means, indicated at 46. Various drive means can be employed; and, as an example, FIG. 1 shows a motor 48 being interconnected to respective drums 44 by pulley belt 49, and pullies 50 and 51, respectively, mounted to drum 44 and motor 48. It should be noted that the rotational speed of drums 44 is adjusted to a higher r.p.m. than that of the r.p.m. of belt/blanket 20. This provides a beating action by the brush elements 54 of drums 44, whereby dirt and dust are agitated and loosened so that they can be removed by vacuuming.

Further included in cleaning means 41 is a fluid applicator 55 that comprises guides 26 and a reservoir 56 which stores a suitable cleaning fluid to be pumped into its related guide 26 by means of pump 60 and line 62. That is, as belt/blanket 20 moves over each guide 26, a cleaning fluid is pumped therein by pump 60, the fluid discharging through a plurality of small holes 64 disposed in each guide roller 26. Thus, cleaning fluid is received in the fibrous material of the filter.

The vacuum means 42 comprises a pair of vacuum systems 42a and 42b arranged at each end of the filter belt 20, so as to vacuum the moving filter before and after it passes over the intake 14 of the engine. Vacuum system 42a includes a first duct 64a having a second duct 65a and a third duct 66a. The intake member 68a of duct 65a is positioned to vacuum the first filter layer 22 as it passes over opening 18, intake member 70a of duct 66a being positioned to vacuum the second layer 24 after it has passed over intake opening 14. Interposed between intake 14 and duct 64a is a vacuum filter 71 which is adapted to be replaceable.

Vacuum system 42b also comprises a first duct member 64b, and second and third duct members 65b and 66b. Duct members 65b and 66b include respective intake members 68b and 70b, with a filter 71 provided therein. Intake member 68b is located adjacent the surface of the outer filter layer 22, and it vacuums the filter after it has passed over opening 18; while intake member 70b is positioned adjacent the surface of the lower second layer 24 just as it starts to pass over turbine intake 14. Thus, as the first and second filter layers pass between opening 18 and turbine intake 14, the filter material is kept free of foreign particles for a greater length of time than heretofore possible, greatly increasing the operational life of the engine.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. An air-filter apparatus in combination with a turbine engine having an air intake, wherein said air-filter apparatus comprises:
   an air filter formed as a continuous movable loop positioned transversely over the air intake of said turbine engine, said air filter being defined by a continuously formed belt-like blanket of fibrous material to filter foreign matter, and having a first outer layer and a second inner layer which continuously move in opposite directions from each other longitudinally;
   means for movably supporting said looped air filter, whereby said air filter moves longitudinally about said support means, said support means including rotatable support spindle guides and tension spindles;
   a first drive means positioned and arranged to drive said air filter;
   a pair of rotating brushes, each brush being positioned within respective looped ends of said air filter to engage said first and second layers thereof;
   brush-drive means attached to said brushes to rotate said brushes at a speed less or greater than the longitudinal movement of said air filter;
   means for applying a cleaning fluid to said air filter, which comprises a plurality of holes formed in said support spindle guides, to supply the cleaning fluid directly to said air filter and a reservoir having a pump interconnected to said support spindle guides, to provide cleaning fluid to said support rollers as said air filter moves thereon;
   a pair of vacuum systems, each being positioned on opposite sides of said turbine engine and having vacuum means for removing said foreign matter from said air filter, and said vacuum systems being connected to said air intake such that said air intake provides a vacuum source.

2. The combination as recited in claim 1, wherein said vacuum means includes a pair of vacuum-intake members, one of said vacuum-intake members being positioned adjacent said first filter layer, and said other vacuum-intake member being positioned adjacent said second filter layer; and wherein a vacuum filter is interposed between each of said pairs of vacuum-intake members and said turbine-engine intake.

3. The combination as recited in claim 2, wherein said first drive means comprises:
   a pair of drive belts secured adjacent the longitudinal edges of said looped air filter in a continuous manner;
   a drive shaft having a pair of drive gears mounted thereto, each drive gear being positioned thereon to engage respective drive belts; and
   a drive motor adapted to drive said drive shaft.

* * * * *